United States Patent
Mochizuki et al.

(10) Patent No.: US 9,530,996 B2
(45) Date of Patent: Dec. 27, 2016

(54) ELECTRIC STORAGE APPARATUS

(71) Applicant: GS Yuasa International Ltd., Kyoto-shi (JP)

(72) Inventors: Ryota Mochizuki, Kyoto (JP); Masao Kawata, Wako (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 0 days.

(21) Appl. No.: 14/602,167

(22) Filed: Jan. 21, 2015

(65) Prior Publication Data
US 2015/0207120 A1 Jul. 23, 2015

(30) Foreign Application Priority Data
Jan. 22, 2014 (JP) .................... 2014-009897

(51) Int. Cl.
*H01M 2/14* (2006.01)
*H01M 2/10* (2006.01)
*H01M 2/18* (2006.01)

(52) U.S. Cl.
CPC ............ *H01M 2/14* (2013.01); *H01M 2/1016* (2013.01); *H01M 2/1066* (2013.01); *H01M 2/1077* (2013.01); *H01M 2/18* (2013.01)

(58) Field of Classification Search
None
See application file for complete search history.

(56) References Cited

U.S. PATENT DOCUMENTS

| | | | | |
|---|---|---|---|---|
| 2,939,901 A | * | 6/1960 | Schultz | H01M 2/1077 429/100 |
| 2010/0151313 A1 | * | 6/2010 | Kosugi | H01M 2/1016 429/158 |
| 2012/0177952 A1 | * | 7/2012 | Maguire | H01M 2/1077 429/1 |
| 2013/0273404 A1 | * | 10/2013 | Ochi | H01M 2/14 429/99 |
| 2014/0120400 A1 | * | 5/2014 | Yoshioka | H01M 2/1077 429/120 |

FOREIGN PATENT DOCUMENTS

JP 2001-023702 A 1/2001

* cited by examiner

*Primary Examiner* — Patrick Ryan
*Assistant Examiner* — Christopher Domone
(74) *Attorney, Agent, or Firm* — McGinn IP Law Group, PPLC.

(57) ABSTRACT

The present invention aims to provide an electric storage apparatus configured to prevent external terminals of adjacent electric storage devices from contacting each other, even if a compressive force in a direction in which a plurality of electric storage devices are aligned acts thereon. In the electric storage apparatus of the present invention, a spacer is arranged between each adjacent two of the plurality of electric storage devices having external terminals, and a portion opposite to the external terminal side of the spacer has a lower rigidity than a portion on the external terminal side of the spacer.

20 Claims, 9 Drawing Sheets

ELECTRIC STORAGE APPARATUS

CROSS-REFERENCE TO RELATED APPLICATION

This application claims priority to Japanese Patent Application No. 2014-009897, the disclosure of which is incorporated herein by reference in its entirety.

FIELD

The present invention relates to an electric storage apparatus including a plurality of electric storage devices.

BACKGROUND

Conventionally, electric storage apparatuses have been provided as power sources for various equipment. Such an electric storage apparatus includes a plurality of electric storage devices aligned in a first direction and having external terminals, a spacer arranged between each adjacent two of the plurality of electric storage devices, and a frame holding the plurality of electric storage devices and the spacer.

The frame includes a pair of end members arranged on both sides in the first direction of the plurality of electric storage devices so as to sandwich the plurality of electric storage devices, and a coupling member coupling the pair of end members to each other (for example, JP 2001-023702 A).

Meanwhile, such an electric storage apparatus, for example, ensures the properties of allowing air to pass between the spacer and each of the electric storage devices by arranging the electric storage devices at equal intervals. For example, in some cases, the spacer of such an electric storage apparatus may be formed into a wave shape that is continuous in a second direction orthogonal to the first direction.

In such a case, when a compressive force (compressive force so as to sandwich the end members) in the first direction acts on the electric storage apparatus, the spacer substantially uniformly deforms as a whole. Therefore, the plurality of electric storage devices come close to each other, thereby causing the external terminals of adjacent electric storage devices to contact each other.

SUMMARY

It is therefore an object of the present invention to provide an electric storage apparatus configured to prevent external terminals of adjacent electric storage devices from contacting each other, even if a compressive force in a direction in which a plurality of electric storage devices are aligned acts thereon.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An electric storage apparatus of the present invention includes: a plurality of electric storage devices aligned in a first direction and having external terminals; and a spacer arranged between each adjacent two of the plurality of electric storage devices, wherein the external terminals of the plurality of electric storage devices are aligned in the first direction, the spacer has a first end on the external terminal side and a second end opposite to the first end in a second direction orthogonal to the first direction, and a portion on the second end side of the spacer has a lower rigidity in the first direction than a portion on the first end side of the spacer.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
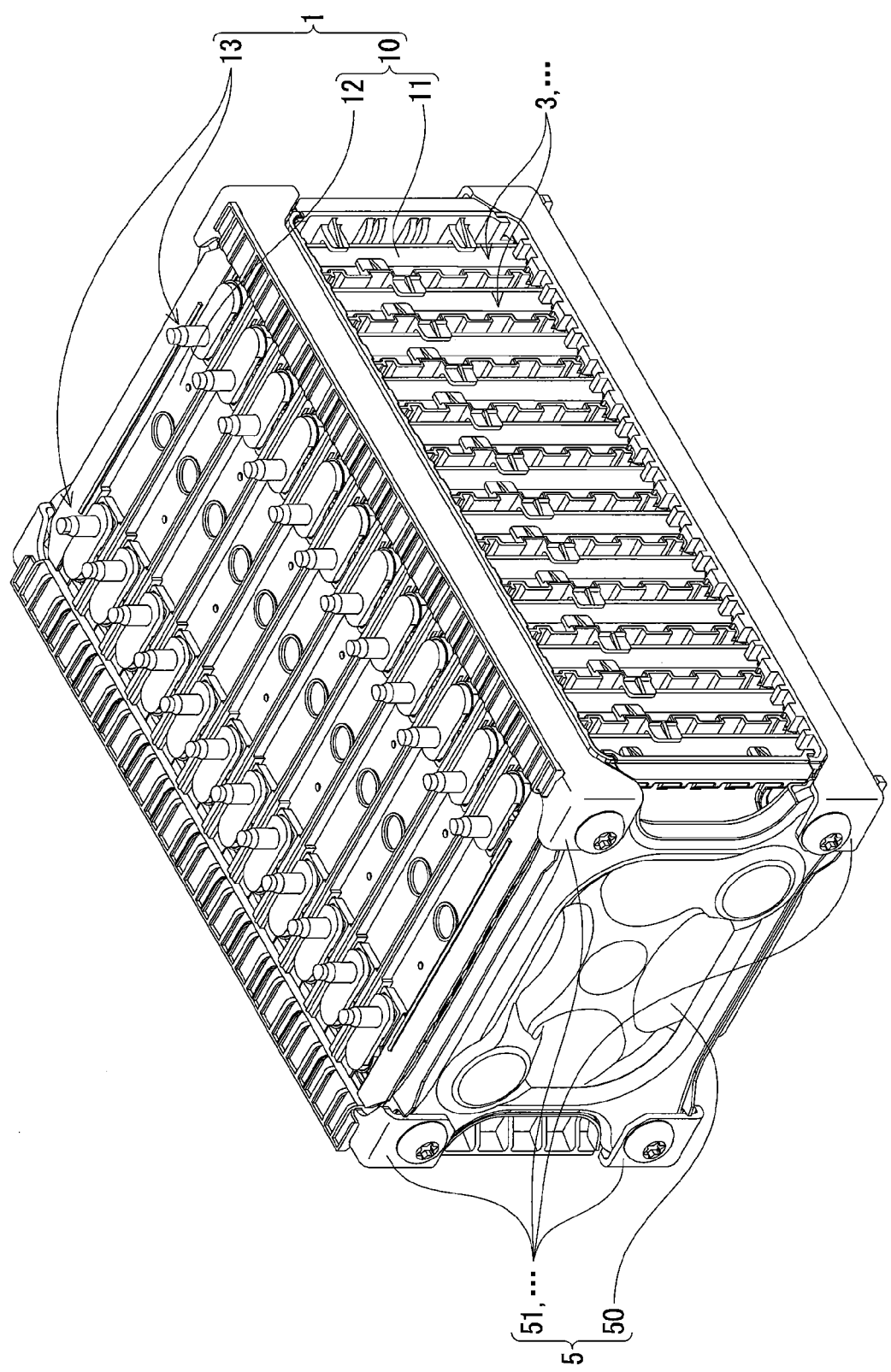
FIG. 1 is a perspective view of an electric storage apparatus according to an embodiment of the present invention.

An electric storage apparatus of the present invention includes: a plurality of electric storage devices aligned in a first direction and having external terminals; and a spacer arranged between each adjacent two of the plurality of electric storage devices, wherein the external terminals of the plurality of electric storage devices are aligned in the first direction, the spacer has a first end on the external terminal side and a second end opposite to the first end in a second direction orthogonal to the first direction, and a portion on the second end side of the spacer has a lower rigidity in the first direction than a portion on the first end side of the spacer.

In the electric storage apparatus configured as above, the spacer is arranged between each adjacent two of the plurality of electric storage devices. Therefore, in the normal state, the plurality of electric storage devices are arranged at intervals in the first direction. It should be noted that the normal state means a state where a compressive force in the first direction does not act on the electric storage apparatus.

In the electric storage apparatus configured as above, the portion on the second end side of the spacer has a lower rigidity in the first direction than the portion on the first end side of the spacer. Therefore, when a compressive force in the first direction acts on the electric storage apparatus, the portion on the second end side of the spacer deforms before the portion on the first end side of the spacer.

Accordingly, ends on the external terminal side of adjacent electric storage devices are maintained spaced from each other, and the other ends of the adjacent electric storage devices opposite to the external terminal side come close to or contact each other.

The configuration may be such that the spacer has a rigidity that decreases intermittently or continuously from the first end or an intermediate position between the first end and the second end toward the second end.

The portion on the second end side of the spacer has a lower rigidity than the portion on the first end side of the spacer. Therefore, when a compressive force in the first direction acts on the electric storage apparatus, the portion on the second end side of the spacer deforms before the portion on the first end side of the spacer.

Accordingly, ends on the external terminal side of adjacent electric storage devices are maintained spaced from each other, and the other ends of the adjacent electric storage devices opposite to the external terminal side come close to or contact each other.

The configuration may be such that the spacer has a plurality of leg parts arranged at intervals in the second direction so as to extend across the adjacent electric storage devices, and those of the plurality of leg parts that are located on the second end side of the spacer have a larger angle with respect to the first direction than those of the plurality of leg parts that are located on the first end side of the spacer.

In the electric storage apparatus configured as above, those of the plurality of leg parts that are located on the second end side of the spacer have a lower rigidity in the first direction than those of the plurality of leg parts that are located on the first end side of the spacer.

Therefore, in the case where a compressive force in the first direction acts on the electric storage apparatus, a stress generated in the plurality of leg parts that are located on the first end side of the spacer is smaller than a stress generated in the plurality of leg parts that are located on the second end side of the spacer.

Accordingly, those of the plurality of leg parts that are located on the second end side of the spacer deform before those of the plurality of leg parts that are located on the first end side of the spacer. Thus, ends on the external terminal side of adjacent electric storage devices are maintained spaced from each other, and the other ends of the adjacent electric storage devices opposite to the external terminal side come close to or contact each other.

The configuration may be such that the spacer has a plurality of leg parts arranged at intervals in the second direction so as to extend across the adjacent electric storage devices, and those of the plurality of leg parts that are located on the second end side of the spacer has a smaller cross-sectional area than those of the plurality of leg parts that are located on the first end side of the spacer.

In the electric storage apparatus configured as above, those of the plurality of leg parts that are located on the second end side of the spacer have a lower rigidity in the first direction than those of the plurality of leg parts that are located on the first end side of the spacer.

Therefore, in the case where a compressive force in the first direction acts on the electric storage apparatus, a stress generated in those of the plurality of leg parts that are located on the first end side of the spacer is smaller than a stress generated in those of the plurality of leg parts that are located on the second end side of the spacer.

Accordingly, those of the plurality of leg parts that are located on the second end side of the spacer deform before those of the plurality of leg parts that are located on the first end side of the spacer. Thus, ends on the external terminal side of adjacent electric storage devices are maintained spaced from each other, and the other ends of the adjacent electric storage devices opposite to the external terminal side come close to or contact each other.

The configuration may be such that those of the plurality of leg parts that are located on the second end side of the spacer have a cross-sectional area that decreases as the distance at which they are arranged from the first end of the spacer increases.

In the electric storage apparatus configured as above, those of the plurality of leg parts that are located on the second end side of the spacer have a rigidity that decreases as the distance at which they are arranged from the first end of the spacer increases. Therefore, when a compressive force in the first direction acts on the electric storage apparatus, those of the plurality of leg parts that are located on the second end side of the spacer deform sequentially from the leg part closest to the second end of the spacer.

Accordingly, the other ends of the adjacent electric storage devices opposite to the external terminal side come close to or contact each other more reliably.

The configuration may be such that those of the plurality of leg parts that are located on the second end side of the spacer have a smaller thickness than those of the plurality of leg parts that are located on the first end side of the spacer.

In the electric storage apparatus configured as above, those of the plurality of leg parts that are located on the second end side of the spacer have a lower rigidity in the first direction than those of the plurality of leg parts that are located on the first end side of the spacer. Therefore, when a compressive force in the first direction acts on the electric storage apparatus, those of the plurality of leg parts that are located on the second end side of the spacer deform before those of the plurality of leg parts that are located on the first end side of the spacer.

Accordingly, ends on the external terminal side of adjacent electric storage devices are maintained spaced from each other, and the other ends of the adjacent electric storage devices opposite to the external terminal side come close to or contact each other.

The configuration may be such that the spacer has a coupling part configured to couple ends of each adjacent two of the leg parts to each other so as to have a square wave shape as viewed in a third direction that is orthogonal to the first direction and the second direction.

In this way, a space is formed between the spacer and each of the electric storage devices. Therefore, the properties of allowing air to pass between the spacer and each of the electric storage devices is ensured.

The configuration may be such that the electric storage apparatus further includes: a frame holding the plurality of electric storage devices and the spacer, wherein the frame includes: a pair of end members arranged at both sides of the plurality of electric storage devices in the first direction so as to sandwich the plurality of electric storage devices; and a coupling member configured to couple the pair of end members to each other.

In the electric storage apparatus configured as above, when a compressive force in the first direction acts on the end members and the coupling member, the spacer is sandwiched by its adjacent electric storage devices. Following this, stresses occur in the leg parts.

At this time, a stress generated in those of the plurality of leg parts that are located on the first end side of the spacer is smaller than a stress generated in those of the plurality of leg parts that are located on the second end side of the spacer. Therefore, ends on the external terminal side of adjacent electric storage devices are maintained spaced from each other, and the other ends of the adjacent electric storage devices opposite to the external terminal side come close to or contact each other.

According to another aspect, an electric storage apparatus of the present invention includes: a plurality of electric storage devices aligned in a first direction and having external terminals; and a spacer arranged between each adjacent two of the plurality of electric storage devices, wherein the external terminals of the plurality of electric storage devices are aligned in the first direction, the spacer has a first end on the external terminal side and a second end opposite to the first end in a second direction orthogonal to the first direction, the spacer has a plurality of leg parts arranged at intervals in the second direction so as to extend across the adjacent electric storage devices, and those of the plurality of leg parts that are located on the second end side of the spacer have a larger angle with respect to the first direction than those of the plurality of leg parts that are located on the first end side of the spacer.

In the electric storage apparatus configured as above, the spacer is arranged between each adjacent two of the plurality of electric storage devices. Therefore, in the normal state, the plurality of electric storage devices are arranged at intervals in the first direction.

Further, those of the plurality of leg parts that are located on the second end side of the spacer have a lower rigidity in the first direction than those of the plurality of leg parts that are located on the first end side of the spacer.

Therefore, in the case where a compressive force in the first direction acts on the electric storage apparatus, a stress generated in those of the plurality of leg parts that are located on the first end side of the spacer is smaller than a stress generated in those of the plurality of leg parts that are located on the second end side of the spacer.

Accordingly, those of the plurality of leg parts that are located on the second end side of the spacer deform before those of the plurality of leg parts that are located on the first end side of the spacer. Thus, ends on the external terminal side of adjacent electric storage devices are maintained spaced from each other, and the other ends of the adjacent electric storage devices opposite to the external terminal side come close to or contact each other.

According to still another aspect, an electric storage apparatus of the present invention includes: a plurality of electric storage devices aligned in a first direction and having external terminals; and a spacer arranged between each adjacent two of the plurality of electric storage devices, wherein the external terminals of the plurality of electric storage devices are aligned in the first direction, the spacer has a first end on the external terminal side and a second end opposite to the first end in a second direction orthogonal to the first direction, the spacer has a plurality of leg parts arranged at intervals in the second direction so as to extend across the adjacent electric storage devices, and those of the plurality of leg parts that are located on the second end side of the spacer have a smaller cross-sectional area than those of the plurality of leg parts that are located on the first end side of the spacer.

In the electric storage apparatus configured as above, the spacer is arranged between each adjacent two of the plurality of electric storage devices. Therefore, in the normal state, the plurality of electric storage devices are arranged at intervals in the first direction.

Further, those of the plurality of leg parts that are located on the second end side of the spacer have a lower rigidity in the first direction than those of the plurality of leg parts that are located on the first end side of the spacer.

Therefore, in the case where a compressive force in the first direction acts on the electric storage apparatus, a stress generated in those of the plurality of leg parts that are located on the first end side of the spacer is smaller than a stress generated in those of the plurality of leg parts that are located on the second end side of the spacer.

Accordingly, those of the plurality of leg parts that are located on the second end side of the spacer deform before those of the plurality of leg parts that are located on the first end side of the spacer. Thus, ends on the external terminal side of adjacent electric storage devices are maintained spaced from each other, and the other ends of the adjacent electric storage devices opposite to the external terminal side come close to or contact each other.

As described above, the electric storage apparatus of the present invention can prevent the external terminals of each adjacent two of the plurality of electric storage devices from contacting each other, even if a compressive force in a direction in which a plurality of electric storage devices are aligned acts thereon.

Figure 2:
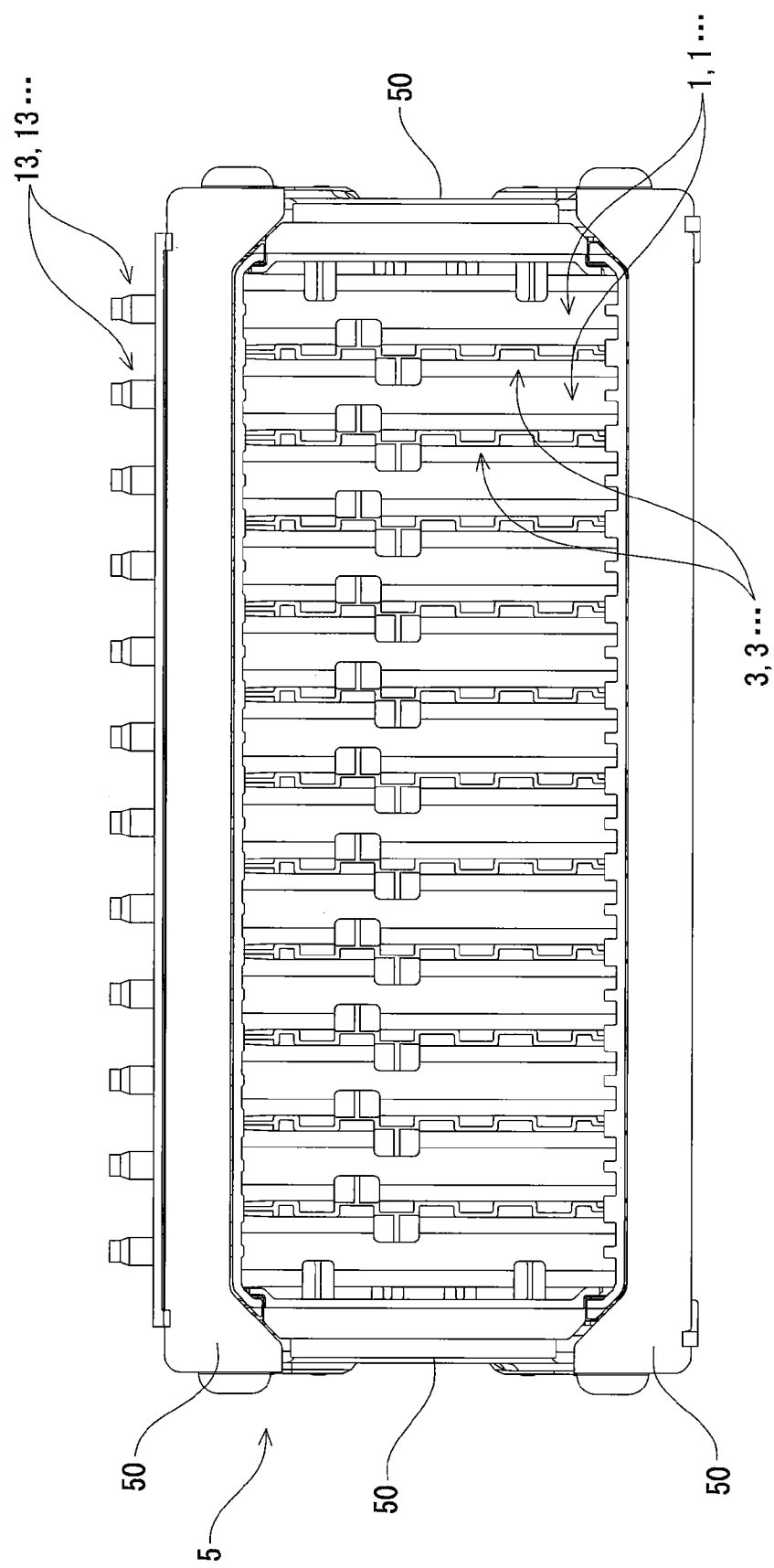
FIG. 2 is a front view of the electric storage apparatus according to the aforementioned embodiment.

Hereinafter, an electric storage apparatus according to an embodiment of the present invention is described with reference to the drawings. As shown in FIG. 1 and FIG. 2, the electric storage apparatus includes a plurality of electric storage devices 1 that are aligned in a first direction and have external terminals 13, and a spacer 3 arranged between each adjacent two of the plurality of electric storage devices 1. Further, the electric storage apparatus includes a frame 5 that holds the plurality of electric storage devices 1 and the spacer 3. The electric storage apparatus according to this embodiment includes three or more electric storage devices 1. Therefore, the electric storage apparatus includes a plurality of spacers 3 arranged respectively between the adjacent electric storage devices 1.

As shown in FIG. 1, an electric storage device 1 includes a case 10 that includes: a case body 11 having an opening; and a cover plate 12 configured to close and seal the opening of the case body 11. The case 10 houses an electrode assembly (not shown in the figure) including a positive electrode plate and a negative electrode plate insulated from each other. The electric storage device 1 is a rectangular battery cell flattened in the first direction.

The electric storage device 1 includes a pair of external terminals 13. The external terminals 13 of the plurality of electric storage devices 1 are aligned in the first direction. One of the pair of the external terminals 13 of the electric storage device 1 is a positive electrode. The other of the pair of the external terminals 13 of the electric storage device 1 is a negative electrode.

The adjacent electric storage devices 1 are arranged so as to have polarities that are opposite to each other. Although not shown in FIG. 1, the external terminals 13 of the adjacent electric storage devices 1 are electrically connected to each other by bus bars having conductivity. This allows the plurality of electric storage devices 1 to be electrically connected to each other so as to constitute a battery.

Figure 3:
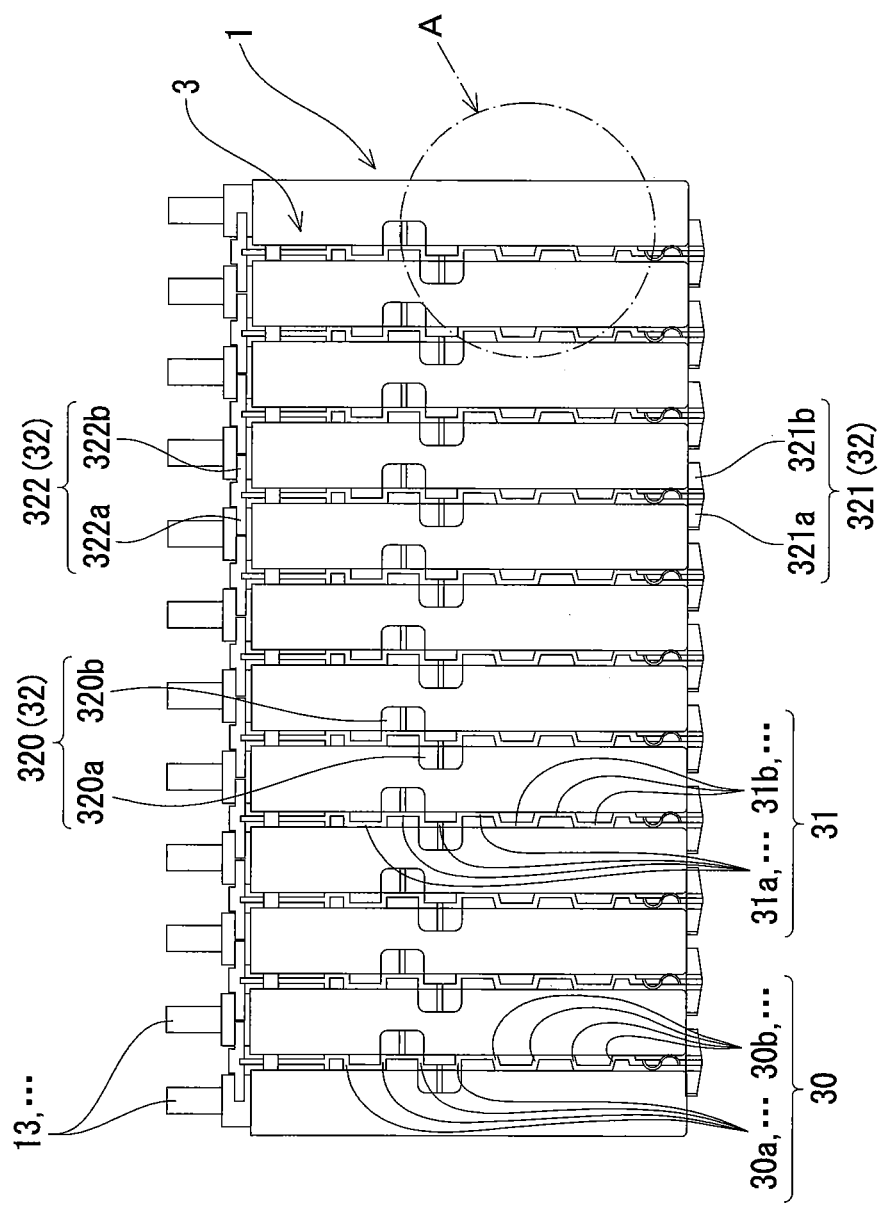
FIG. 3 is a front view of electric storage devices and spacers of the electric storage apparatus according to the aforementioned embodiment.
Figure 5:
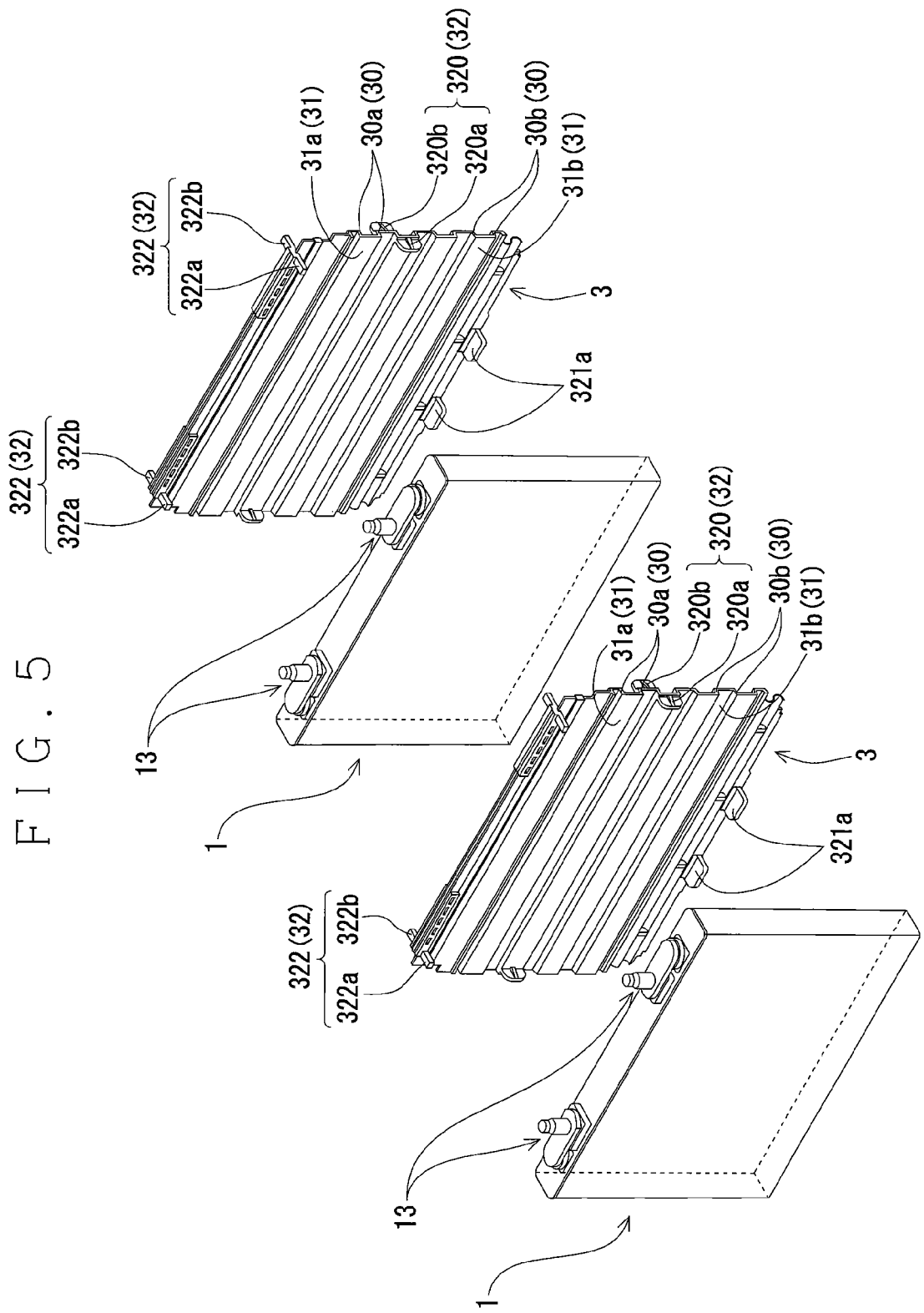
FIG. 5 is an exploded perspective view of the electric storage devices and the spacers of the electric storage apparatus according to the aforementioned embodiment.

As shown in FIG. 3 and FIG. 5, the spacer 3 has a first end on the external terminal 13 side and a second end on the opposite side of the first end in a second direction orthogonal to the first direction.

The spacer 3 has a plurality of leg parts 30 that are arranged at intervals in the second direction so as to extend across the adjacent electric storage devices 1. Further, the spacer 3 has a coupling part 31 configured to couple ends of each adjacent two of the leg parts 30 to each other. Further, the spacer 3 has a holding structure 32 for holding the electric storage device 1 arranged between itself and its adjacent spacer 3.

In this embodiment, those of the plurality of leg parts 30 that are located on the first end side (the external terminal 13 side) of the spacer 3 are denoted by the reference numeral 30a, and those of the plurality of leg parts 30 that are located on the second end side (the opposite side of the external terminal 13 side) of the spacer 3 are denoted by the reference numeral 30b.

Figure 6:
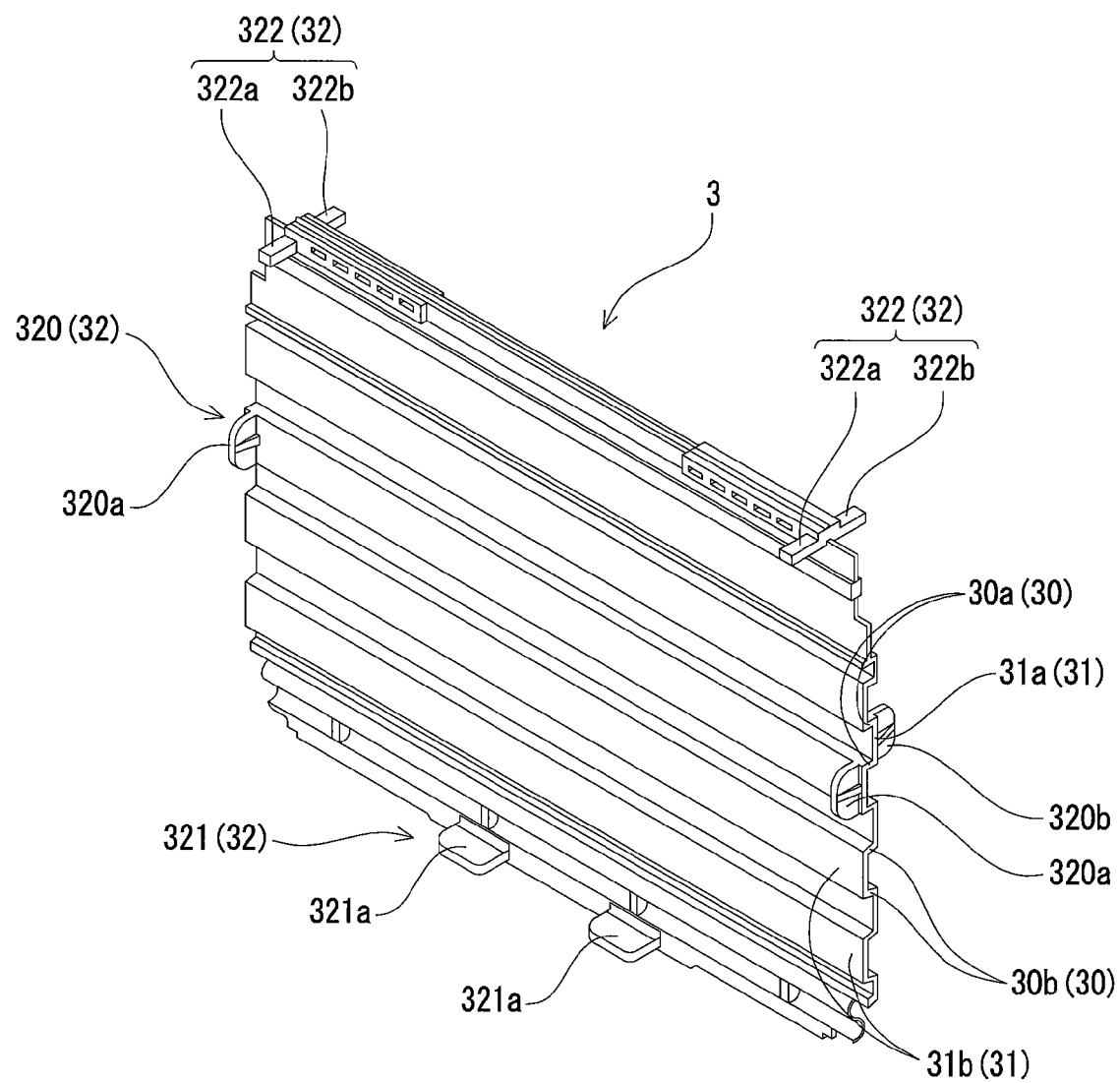
FIG. 6 is a perspective view of a spacer of the electric storage apparatus according to the aforementioned embodiment.
Figure 7:
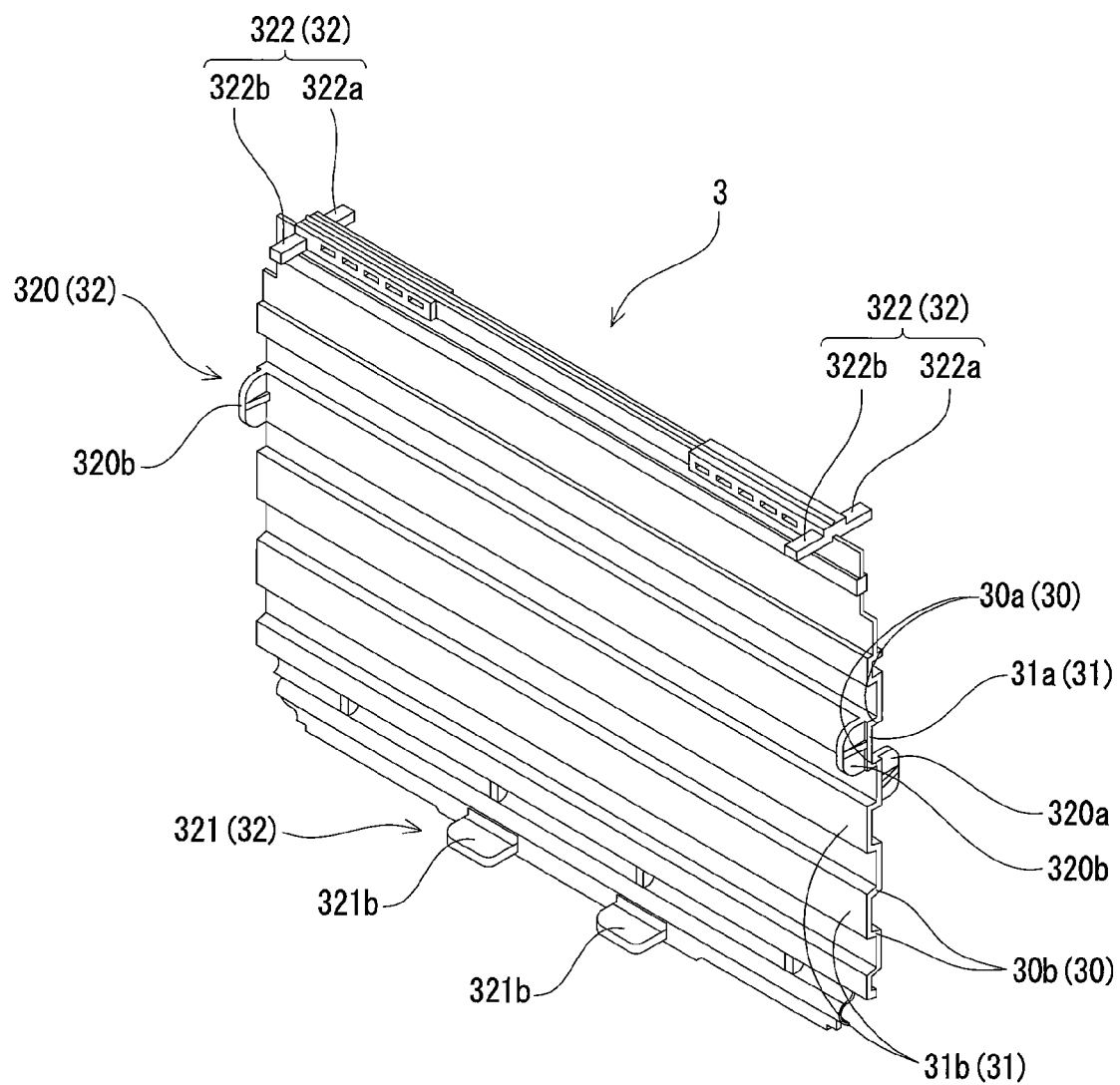
FIG. 7 is a perspective view of a spacer of the electric storage apparatus according to the aforementioned embodiment.

As shown in FIG. 6 and FIG. 7, the leg parts 30 (30a and 30b) each extend straight in a third direction orthogonal to the first direction and the second direction. The leg parts 30 each have a first end and a second end on the opposite side of the first end in the first direction. Therefore, as shown in FIG. 3, the first ends of the leg parts 30 (30a and 30b) abut one of the adjacent electric storage devices 1. The second ends of the leg parts 30 (30a and 30b) abut the other of the adjacent electric storage devices 1.

Figure 4:
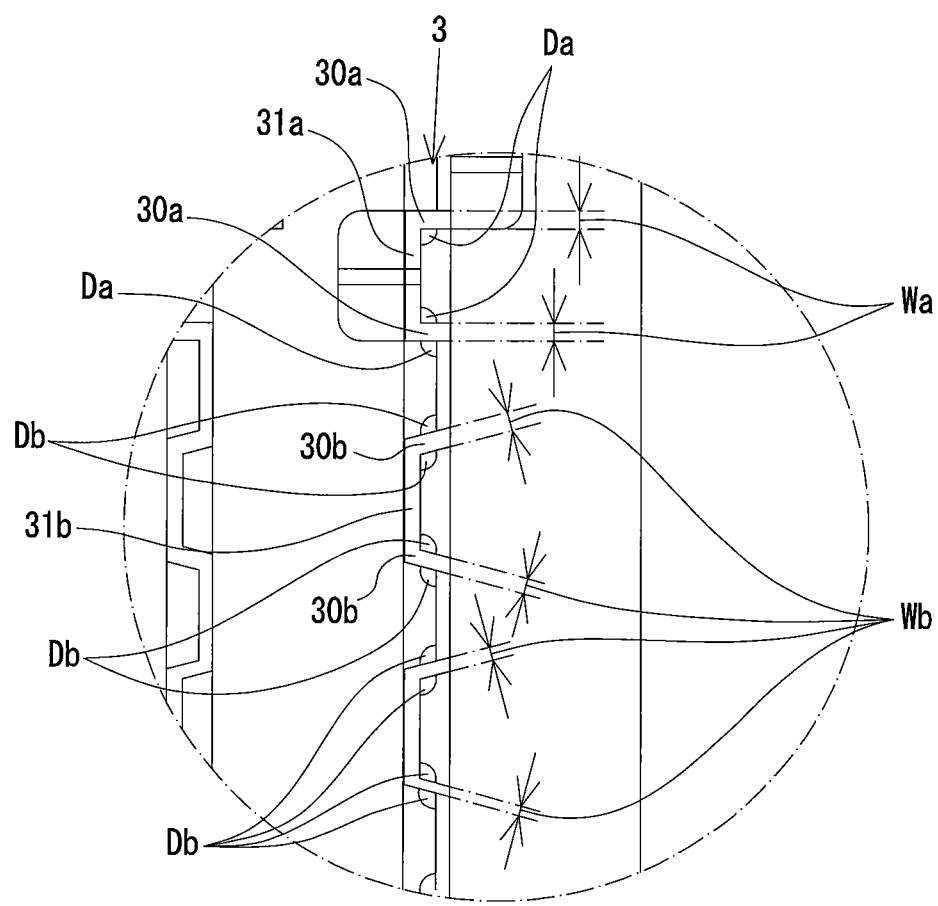
FIG. 4 is an enlarged partial view of the electric storage apparatus according to the aforementioned embodiment.

As shown in FIG. 4, the leg parts 30a located on the first end side of the spacer 3 each have the same or substantially the same thickness Wa. Therefore, the leg parts 30a located on the first end side of the spacer 3 each have the same or substantially the same cross-sectional area. FIG. 4 is an enlarged view of the region A shown in FIG. 3.

In this embodiment, the leg parts 30b located on the second end side of the spacer 3 have a thickness (width) Wb that is smaller than the thickness (width) Wa of the leg parts 30a located on the first end side of the spacer 3. Therefore, the leg parts 30b located on the second end side of the spacer 3 have a cross-sectional area that is smaller than the cross-sectional area of the leg parts 30a located on the first end side of the spacer 3.

Moreover, the thickness Wb of the leg parts 30b located on the second end side of the spacer 3 decreases as the distance at which they are arranged from the first end of the spacer 3 increases. Therefore, the cross-sectional area of the leg parts 30b located on the second end side of the spacer 3 decreases as the distance at which they are arranged from the first end of the spacer 3 increases.

As shown in FIG. 6 and FIG. 7, the coupling part 31 is formed to have a flat plate shape extending in the second direction and the third direction. Further, the coupling part 31 has a first end and a second end on the opposite side of the first end in the third direction. Coupling parts 31 according to this embodiment includes a plurality of first coupling parts 31a configured to couple the leg parts 30a located on the first end side of the spacer 3 and a plurality of second coupling parts 31b configured to couple the leg parts 30b located on the second end side of the spacer 3.

The first coupling parts 31a are arranged in the second direction, alternately on the first end side of the leg part 30a located on the first end side of the spacer 3 and on the second end side of the leg part 30a located on the first end side of the spacer 3. The second coupling parts 31b are arranged in the second direction, alternately on the first end side of the leg part 30b located on the second end side of the spacer 3 and on the second end side of the leg part 30b located on the second end side of the spacer 3. Therefore, the spacer 3 has a square wave shape as viewed in the third direction.

In this embodiment, the portion of the spacer 3 formed by the leg parts 30 and the coupling parts 31 may be referred to as a spacer body in the description.

In the electric storage apparatus according to this embodiment, the leg parts 30b located on the second end side of the spacer 3 have a larger angle with respect to the first direction than the leg parts 30a located on the first end side of the spacer 3. Further, as shown in FIG. 4, an inclination angle Db of the leg parts 30b located on the second end side of the spacer 3 with respect to the second coupling parts 31b is larger than an inclination angle Da of the leg parts 30a located on the first end side of the spacer 3 with respect to the first coupling parts 31a.

A specific description is given below. The leg parts 30a located on the first end side of the spacer 3 are orthogonal to the first coupling parts 31a. That is, the corners formed by the leg parts 30a located on the first end side of the spacer 3 and the first coupling parts 31a are at right angles.

The leg parts 30b located on the second end side of the spacer 3 intersect the second coupling parts 31b. Further, the corners formed by the leg parts 30b located on the second end side of the spacer 3 and the second coupling parts 31b are at obtuse angles.

As shown in FIG. 6 and FIG. 7, the holding structure 32 has peripheral wall holding parts 320 provided at both ends in the third direction of one of the coupling parts 31, bottom holding parts 321 provided at the second end of the spacer 3, and cover plate holding parts 322 provided at the first end of the spacer 3.

The peripheral wall holding parts 320 include first peripheral wall holding parts 320a provided on one of the first coupling parts 31a coupling the first ends of the leg parts 30a located on the first end side of the spacer 3, and second peripheral wall holding parts 320b provided on one of the first coupling parts 31a coupling the second ends of the leg parts 30a located on the first end side of the spacer 3.

The first peripheral wall holding parts 320a are provided on the furthest one of the plurality of first coupling parts 31a from the external terminals 13. Further, the first peripheral wall holding parts 320a extend opposite to the side of the first coupling part 31a coupling the second ends of the leg parts 30a that are located on the first end side of the spacer 3.

The second peripheral wall holding parts 320b are provided on one of the first coupling parts 31a that is located closer to the external terminal 13 side than the first peripheral wall holding parts 320a. Further, the second peripheral wall holding parts 320b extend opposite to the side of the first coupling part 31a coupling the first ends of the leg parts 30a.

The bottom holding parts 321 are provided at the end of the spacer body opposite to the external terminal 13 side. Further, the bottom holding parts 321 each have a first mounting part 321a (see FIG. 6) extending on one side bounded by the spacer body, and a second mounting part 321b (see FIG. 7) extending on the other side bounded by the spacer body. The bottom holding parts 321 according to this embodiment include a pair of first mounting parts 321a and a pair of second mounting parts 321b. As shown in FIG. 6, the pair of first mounting parts 321a are arranged at an interval from each other in the third direction. Further, as shown in FIG. 7, the pair of second mounting parts 321b are arranged at an interval from each other in the third direction.

The cover plate holding parts 322 are provided on the external terminal 13 side of the spacer body. Further, the cover plate holding parts 322 each have a first holding part 322a extending from the spacer body toward one side in the first direction, and a second holding part 322b extending from the spacer body toward the other side in the first direction. Further, the spacer body has two cover plate holding parts 322 provided at an interval in the third direction.

As shown in FIG. 1 and FIG. 2, the frame 5 includes a pair of end members 50 arranged on both sides in the first direction of the plurality of electric storage devices 1 so as to sandwich the plurality of electric storage devices 1, and a coupling member 51 configured to couple the pair of end members 50 to each other. Therefore, the spacers 3 are sandwiched by the plurality of electric storage devices 1 and the pair of end members 50.

The electric storage apparatus according to this embodiment is as described above. Subsequently, a mechanism for preventing the external terminals 13 of each electric storage device 1 from contacting the external terminals 13 of its adjacent electric storage device 1 when a compressive force in a direction in which the plurality of electric storage devices 1 are aligned acts on the electric storage apparatus is described with reference to the attached drawings.

As described above, the electric storage devices 1 of this embodiment are aligned in the first direction. Therefore, the following description is given in this embodiment, assuming that a compressive force in the first direction (compressive force to sandwich the pair of end members 50 in the first direction) acts on the electric storage apparatus.

When a compressive force in the first direction acts on the electric storage apparatus, the electric storage devices 1 and the spacers 3 are sandwiched by the end members 50. Therefore, each spacer 3 is sandwiched by its adjacent electric storage devices 1. Following this, the coupling parts 31 of the spacer 3 (the first coupling parts 31a and the second coupling parts 31b) receive the compressive force from the electric storage devices 1.

Therefore, the compressive force is transmitted to the leg parts 30a located on the first end side of the spacer 3 from the first coupling parts 31a, and to the leg parts 30b located on the second end side of the spacer 3 from the second coupling parts 31b.

Figure 8:
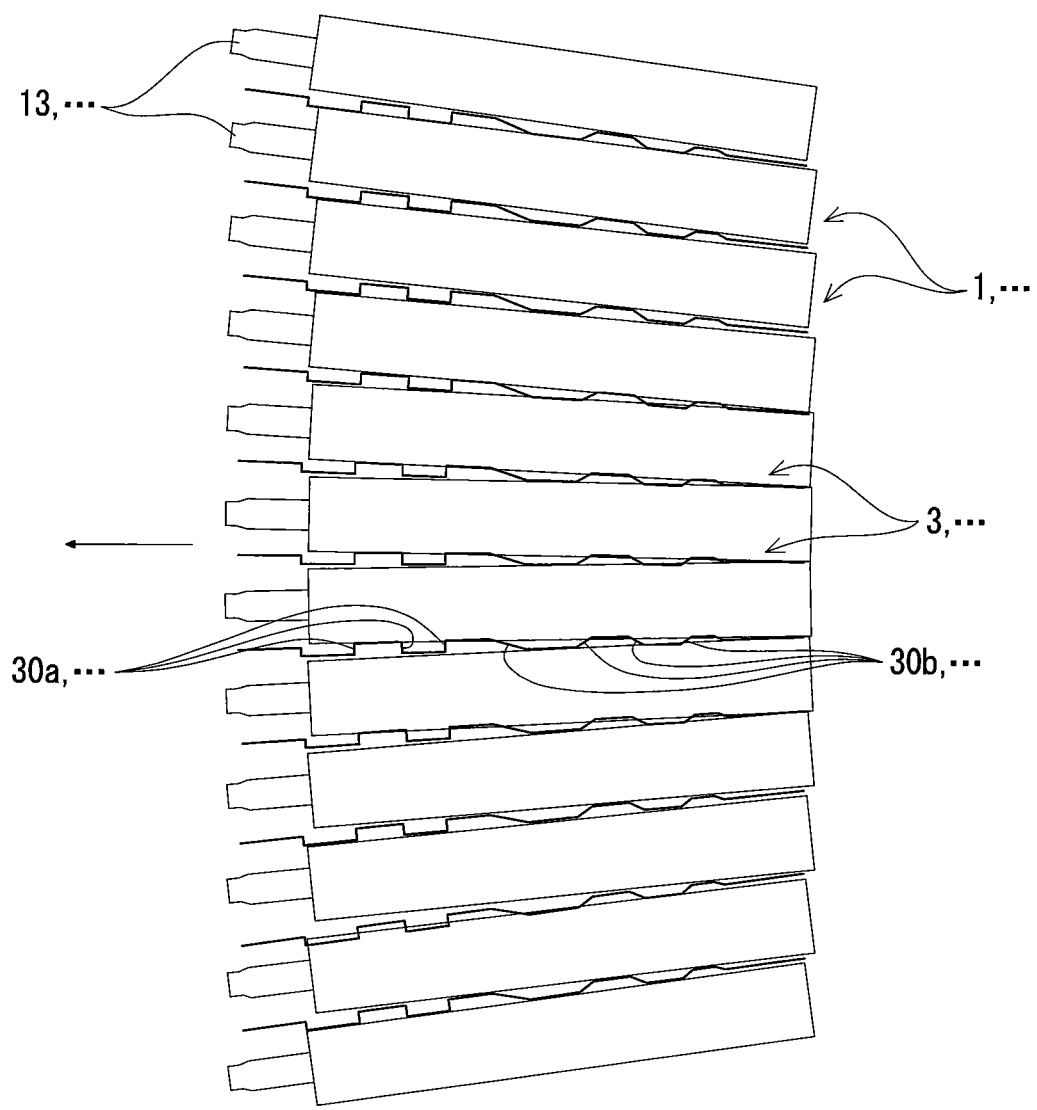
FIG. 8 is a state diagram in which a compressive force in a first direction acts on the electric storage apparatus according to the aforementioned embodiment.

In such a state, as shown in FIG. 8, the leg parts 30b located on the second end side of the spacer 3 deform before the leg parts 30a located on the first end side of the spacer 3. That is, the portion on the second end side of the spacer 3 deforms before the portion on the first end side of the spacer 3.

Therefore, ends on the external terminal 13 side of the adjacent electric storage devices 1 are maintained spaced from each other, and the other ends of the adjacent electric storage devices 1 opposite to the external terminal 13 side come close to or contact each other.

The electric storage apparatus according to this embodiment may be configured so that the electric storage devices 1 project toward the external terminal 13 side (in the direction shown by the arrow in FIG. 8) when the compressive force increases further.

As described above, in the electric storage apparatus according to this embodiment, the spacer 3 is arranged between each adjacent two of the plurality of electric storage devices 1. Therefore, in the normal state, the plurality of electric storage devices 1 are arranged at intervals in the first direction. It should be noted that the normal state means a state where a compressive force in the first direction does not act on the electric storage apparatus.

Further, the portion on the second end side of the spacer 3 has a lower rigidity in the first direction than the portion on the first end side of the spacer 3. Therefore, when a compressive force acts on the electric storage apparatus, the portion on the second end side of the spacer 3 deforms before the portion on the first end side of the spacer 3.

Thus, ends on the external terminal 13 side of the adjacent electric storage devices 1 are maintained spaced from each other, and the other ends of the adjacent electric storage devices 1 opposite to the external terminal 13 side come close to or contact each other.

Accordingly, the electric storage apparatus can prevent the external terminals 13 of the adjacent electric storage devices 1 from contacting each other even if a compressive force in the first direction acts thereon.

In this embodiment, as described above, the leg parts 30b located on the second end side of the spacer 3 have a larger angle with respect to the first direction than the leg parts 30a located on the first end side of the spacer 3, and the leg parts 30b located on the second end side of the spacer 3 have a smaller thickness than the leg parts 30a located on the first end side of the spacer 3. Therefore, the leg parts 30b located on the second end side of the spacer 3 have a lower rigidity in the first direction than the leg parts 30a located on the first end side of the spacer 3.

Accordingly, when the compressive force acts on the electric storage apparatus, a stress generated in the leg parts 30a located on the first end side of the spacer 3 is smaller than a stress generated in the leg parts 30b located on the first end side of the spacer 3. Therefore, when the compressive force acts on the electric storage apparatus, the leg parts 30b located on the second end side of the spacer 3 deform before the leg parts 30a located on the first end side of the spacer 3.

Further, in the electric storage apparatus according to this embodiment, even if the compressive force acts on the end members 50 and the coupling member 51 of the frame 5, the ends on the external terminal 13 side of the adjacent electric storage device 1 are maintained spaced from each other, and the other ends of the adjacent electric storage device 1 that are opposite to the external terminal 13 side come close to or contact each other.

Further, the spacer 3 has the coupling parts 31 configured to couple the ends of adjacent leg parts 30 to each other so as to have a square wave shape as viewed in the third direction that is orthogonal to the first direction and the second direction. Therefore, a space is formed between the spacer 3 and each of the electric storage devices 1. Accordingly, the properties of allowing air to pass between the spacer 3 and the electric storage device 1 is ensured.

It should be noted that the electric storage apparatus according to the present invention is not limited to the above described embodiments, and it is a matter of course that various modifications can be made without departing from the gist of the present invention.

In the aforementioned embodiments, the electric storage apparatus includes the plurality of the spacer 3. However, there is no limitation to this. For example, in the case of having two electric storage devices 1, the electric storage apparatus may have one spacer 3 arranged between the two electric storage devices 1.

In the aforementioned embodiments, the spacer 3 includes the plurality of the leg parts 30a and the plurality of the leg parts 30b. However, there is no limitation to this. For example, the spacer 3 may include a plurality of the leg parts 30a and one leg part 30b, or may include one leg part 30a and a plurality of the leg parts 30b. Further, the spacer 3 may include one leg part 30a and one leg part 30b.

In the aforementioned embodiments, the spacer 3 is formed to have a rigidity that decreases continuously from an intermediate position between the first end and the second end toward the second end. However, there is no limitation to this. For example, the rigidity of the spacer 3 may decrease continuously from the first end toward the second end. In this case, for example, the plurality of leg parts 30 may have a cross-sectional area that decreases as the distance at which they are arranged from the first end of the spacer 3 increases. That is, the plurality of leg parts 30 may have a thickness that decreases as the distance at which they are arranged from the first end of the spacer 3 increases.

Figure 9:
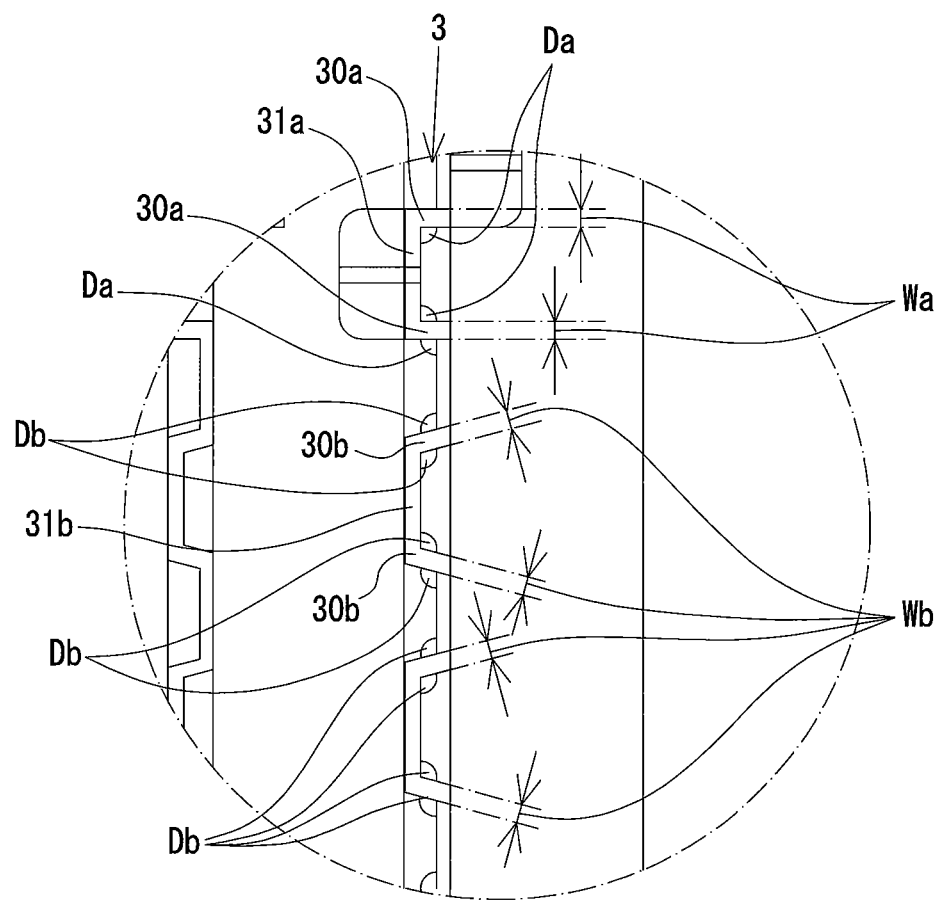
FIG. 9 is an enlarged partial view of an electric storage apparatus according to another embodiment of the present invention.

Further, in the aforementioned embodiments, the thickness Wb of the leg parts 30b located on the second end side of the spacer 3 decreases as the distance at which they are arranged from the first end of the spacer 3 increases. However, there is no limitation to this. For example, as shown in FIG. 9, the thickness Wb of the leg parts 30b located on the second end side of the spacer 3 may be constant or substantially constant. That is, the cross-sectional area of the leg parts 30b located on the second end side of the spacer 3 may be constant or substantially constant. In this case, the thickness Wb of the leg parts 30b located on the second end side of the spacer 3 may be smaller than the thickness Wa of the leg parts 30a located on the first end side of the spacer 3.

In the aforementioned embodiments, the rigidity of the spacer 3 decreases continuously from an intermediate position between the first end and the second end toward the second end. However, there is no limitation to this. For example, the rigidity of the spacer 3 may decrease intermittently from an intermediate position between the first end and the second end toward the second end.

Further, in the aforementioned embodiments, the angle Db formed by the leg parts 30b located opposite to the external terminal 13 side and the coupling parts 31 is constant. However, there is no limitation to this. For example, the angle Db formed by the leg parts 30b and the coupling parts 31 may decrease toward the external terminal 13 side.

Further, in the aforementioned embodiments, the first peripheral wall holding parts 320a are provided on the first coupling parts 31a coupling the first ends of the leg parts 30a to each other, and the second peripheral wall holding parts 320b are provided on the first coupling parts 31a coupling the second ends of the leg parts 30a to each other. However, there is no limitation to this. For example, the first peripheral wall holding parts 320a and the second peripheral wall holding parts 320b may be provided on the second coupling parts 31b as long as they extend in directions opposite to each other along the first direction.

Though not particularly mentioned in the embodiments, the rigidity of the spacer 3 is determined by measuring the force to compress the spacer 3 to a specific amount in the first direction.

A specific description is given below. In order to determine the rigidity of the spacer 3, a pair of plate members to sandwich the spacer 3 are used. The pair of plate members are configured to sandwich a part of the spacer 3. The pair of plate members need only to partially abut the spacer 3.

During the measurement of the force to compress the spacer 3 to a specific amount in the first direction, the plate members are arranged at both sides (both sides in the first direction) of the spacer 3. At this time, the pair of plate members are parallel to each other.

Then, while the pair of plate members are maintained parallel to each other, the spacer 3 is compressed by the pair of plate members. Further, at the instant when the spacer 3 is compressed to a specific amount in the first direction, the force (compressive force) acting on the spacer 3 due to the plate members is measured.

In the case where the portion on the first end side of the spacer 3 has higher rigidity than the portion on the second end side of the spacer 3, the force with which the portion on the first end side of the spacer 3 is compressed to a specific amount is larger than the force with which the portion on the second end side of the spacer 3 is compressed to a specific amount.

In this way, the rigidity of the spacer 3 is determined by comparing the force with which the portion on the first end side of the spacer 3 is compressed to a specific amount with the force with which the portion on the second end side of the spacer 3 is compressed to a specific amount.

What is claimed is:

1. An electric storage apparatus, comprising:
   a plurality of electric storage devices aligned in a first direction and including external terminals; and
   a spacer arranged between each adjacent two of the plurality of electric storage devices,
   wherein the external terminals of the plurality of electric storage devices are aligned in the first direction,
   wherein the spacer includes a first end on an external terminal side and a second end opposite to the first end in a second direction orthogonal to the first direction, and
   wherein a portion on a second end side of the spacer has a lower rigidity in the first direction than a portion on a first end side of the spacer.

2. The electric storage apparatus according to claim 1, wherein the spacer has a rigidity that decreases intermittently or continuously from the first end or an intermediate position between the first end and the second end toward the second end.

3. The electric storage apparatus according to claim 1, wherein the spacer includes a plurality of leg parts arranged at intervals in the second direction so as to extend across the adjacent electric storage devices, and
   wherein those of the plurality of leg parts that are located on the second end side of the spacer have a larger angle with respect to the first direction than those of the plurality of leg parts that are located on the first end side of the spacer.

4. The electric storage apparatus according to claim 1, wherein the spacer includes a plurality of leg parts arranged at intervals in the second direction so as to extend across the adjacent electric storage devices, and
   wherein those of the plurality of leg parts that are located on the second end side of the spacer have a smaller cross-sectional area than those of the plurality of leg parts that are located on the first end side of the spacer.

5. The electric storage apparatus according to claim 4, wherein those of the plurality of leg parts that are located on the second end side of the spacer have a cross-sectional area that decreases as a distance at which they are arranged from the first end of the spacer increases.

6. The electric storage apparatus according to claim 4, wherein those of the plurality of leg parts that are located on the second end side of the spacer have a smaller thickness than those of the plurality of leg parts that are located on the first end side of the spacer.

7. The electric storage apparatus according to claim 3, wherein the spacer includes a coupling part configured to couple ends of each adjacent two of the leg parts to each other so as to have a square wave shape as viewed in a third direction that is orthogonal to the first direction and the second direction.

8. The electric storage apparatus according to claim 4, wherein the spacer includes a coupling part configured to couple ends of each adjacent two of the leg parts to each other so as to have a square wave shape as viewed in a third direction that is orthogonal to the first direction and the second direction.

9. The electric storage apparatus according to claim 1, further comprising:
a frame holding the plurality of electric storage devices and the spacer,
wherein the frame comprises:
a pair of end members arranged at both sides of the plurality of electric storage devices in the first direction so as to sandwich the plurality of electric storage devices; and
a coupling member configured to couple the pair of end members to each other.

10. An electric storage apparatus, comprising:
a plurality of electric storage devices aligned in a first direction and including external terminals; and
a spacer arranged between each adjacent two of the plurality of electric storage devices,
wherein the external terminals of the plurality of electric storage devices are aligned in the first direction,
wherein the spacer includes a first end on the external terminal side and a second end opposite to the first end in a second direction orthogonal to the first direction,
wherein the spacer includes a plurality of leg parts arranged at intervals in the second direction so as to extend across the adjacent electric storage devices, and
wherein those of the plurality of leg parts that are located on a second end side of the spacer have a larger angle with respect to the first direction than those of the plurality of leg parts that are located on a first end side of the spacer.

11. An electric storage apparatus, comprising:
a plurality of electric storage devices aligned in a first direction and including external terminals; and
a spacer arranged between each adjacent two of the plurality of electric storage devices,
wherein the external terminals of the plurality of electric storage devices are aligned in the first direction,
wherein the spacer includes a first end on the external terminal side and a second end opposite to the first end in a second direction orthogonal to the first direction,
wherein the spacer includes a plurality of leg parts arranged at intervals in the second direction so as to extend across the adjacent electric storage devices, and
wherein those of the plurality of leg parts that are located on a second end side of the spacer have a smaller cross-sectional area than those of the plurality of leg parts that are located on a first end side of the spacer.

12. The electric storage apparatus according to claim 10, wherein a portion on the second end side of the spacer has a different rigidity in the first direction than a portion on the first end side of the spacer.

13. The electric storage apparatus according to claim 12, wherein the spacer has a rigidity that decreases intermittently or continuously from the first end or an intermediate position between the first end and the second end toward the second end.

14. The electric storage apparatus according to claim 12, wherein the spacer has a rigidity that decreases continuously from the first end or an intermediate position between the first end and the second end toward the second end.

15. The electric storage apparatus according to claim 10, wherein the spacer has a rigidity that decreases continuously from the first end or an intermediate position between the first end and the second end toward the second end.

16. The electric storage apparatus according to claim 11, wherein a portion on the second end side of the spacer has a different rigidity in the first direction than a portion on the first end side of the spacer.

17. The electric storage apparatus according to claim 16, wherein the spacer has a rigidity that decreases intermittently or continuously from the first end or an intermediate position between the first end and the second end toward the second end.

18. The electric storage apparatus according to claim 16, wherein the spacer has a rigidity that decreases continuously from the first end or an intermediate position between the first end and the second end toward the second end.

19. The electric storage apparatus according to claim 11, wherein the spacer has a rigidity that decreases continuously from the first end or an intermediate position between the first end and the second end toward the second end.

20. The electric storage apparatus according to claim 1, wherein the spacer has a rigidity that decreases continuously from the first end or an intermediate position between the first end and the second end toward the second end.

* * * * *